United States Patent [19]
Pels

[11] Patent Number: 5,376,395
[45] Date of Patent: Dec. 27, 1994

[54] COOKING MACHINE

[75] Inventor: Michael C. Pels, Waverley, Australia

[73] Assignee: Real Foods Pty Ltd, New South Wales, Australia

[21] Appl. No.: 50,237

[22] PCT Filed: Nov. 18, 1991

[86] PCT No.: PCT/AU91/00526

§ 371 Date: May 11, 1993

§ 102(e) Date: May 11, 1993

[87] PCT Pub. No.: WO92/08375

PCT Pub. Date: May 29, 1992

[30] Foreign Application Priority Data

Nov. 19, 1990 [AU] Australia .................. PK3414

[51] Int. Cl.$^5$ .................. A23L 1/00; A47J 37/00
[52] U.S. Cl. .................. 426/446; 99/349; 99/372; 99/439; 99/323.4; 426/523; 425/261
[58] Field of Search .................. 99/349, 353, 372, 373, 99/377, 379, 380, 381, 426, 427, 439, 323.4, 326, 331; 100/244, 264, 93 P; 426/446, 523, 512; 425/159, 157, 150, 4 R, 256, 261, 447

[56] References Cited

U.S. PATENT DOCUMENTS

| | | | |
|---|---|---|---|
| 3,005,402 | 10/1961 | Starger et al. | 100/93 P |
| 3,776,124 | 12/1973 | Morley | 99/373 |
| 4,281,593 | 8/1981 | Gevaert | 99/349 |
| 4,328,741 | 5/1982 | Yoshikazu | 100/93 P |
| 4,586,896 | 5/1986 | Smith | 100/93 P |
| 4,667,588 | 5/1987 | Hayashi | 99/372 |
| 5,102,677 | 4/1992 | Van Den Berghe | 99/372 |

FOREIGN PATENT DOCUMENTS

| | | |
|---|---|---|
| 4821285 | 4/1986 | Australia . |
| 1397288 | 9/1988 | Australia . |
| 1000927 | 5/1989 | Belgium . |
| 0344867 | 12/1989 | European Pat. Off. . |
| 325956 | 1/1958 | Switzerland . |

OTHER PUBLICATIONS

Supplementary Partial European Search Report, Annex and Sheet B to the Supplementary Partial European Search Report.

Primary Examiner—David A. Scherbel
Assistant Examiner—Reginald L. Alexander
Attorney, Agent, or Firm—Sandler, Greenblum & Bernstein

[57] ABSTRACT

Cooking machine and method include a mould with first and second similarly shaped end walls and a generally surrounding, continuous side wall, the three walls together defining an internal moulding volume, with the three walls being reciprocally movable relative to one another. Heating elements are provided in at least one wall or in thermal contact therewith, and a control mechanism controls at least relative movement of the walls so that at the end of a predetermined cooking cycle the end walls and the sidewall are relatively separated to retract both end walls from the moulding volume simultaneously.

9 Claims, 3 Drawing Sheets

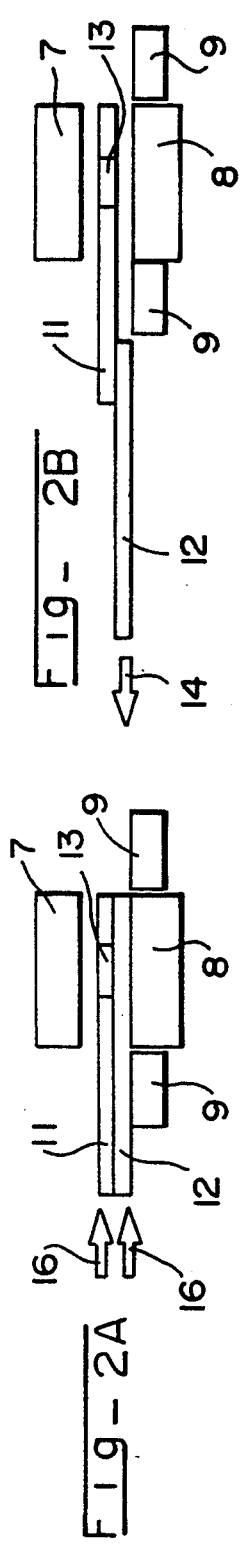
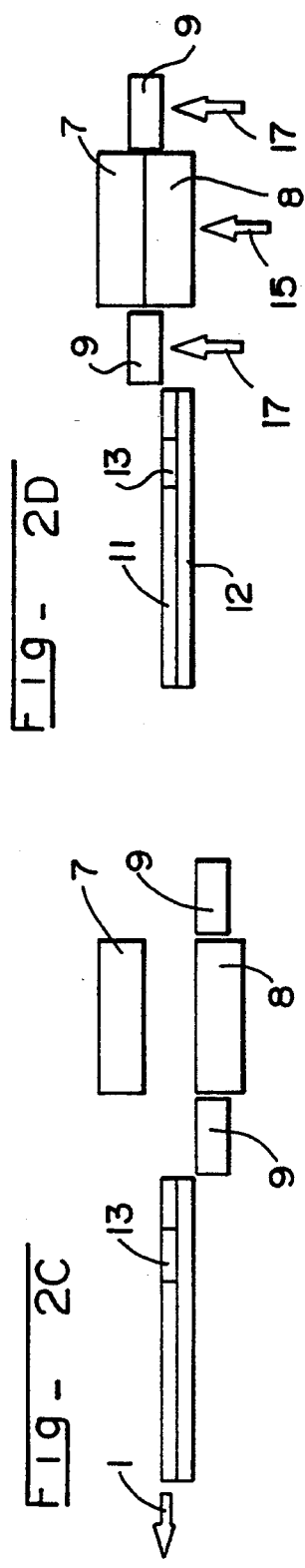
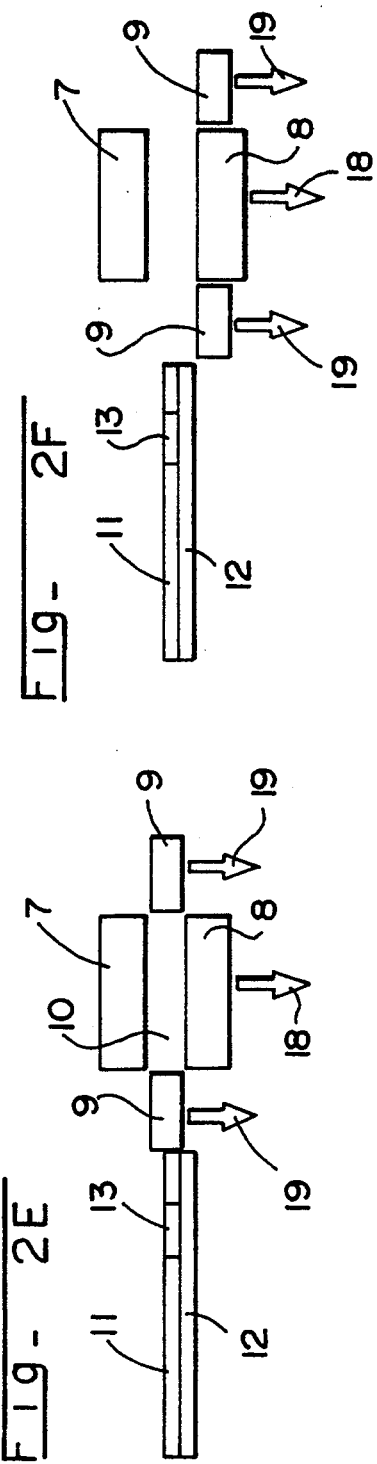

COOKING MACHINE

BACKGROUND OF THE INVENTION

This invention relates to a cooking machine particularly useful for cooking rice cakes, sometimes known as rice wafers, although any suitable product could be cooked using the machine and method according to the invention. The rice cakes are preferably a puffed rice crispbread type product. The invention also relates to a pnematic device suitable for use in such a cooking machine.

Known in the prior art, for example from U.S. Pat. No. 4,328,741, is an automatic machine for making rice cakes which includes a generally cylindrical shaped mould consisting of three components. The three components are a generally cylindrical continuous side wall with open ends, the open ends being occupied by respective reciprocally movable end walls which closely fit within the cylindrical wall. Heating elements are included and used so as to control the temperature within a predetermined operating range. An uncooked rice mixture is introduced into the mould and crushed before cooking. After a predetermined cooking period, the rice cake is allowed to expand as only the top end wall is withdrawn and then the cooked rice cake is ejected.

Although the above-described apparatus works reasonably well, it has been found that there is room for improvement as the rice cakes produced in the machine are not as consistent in quality as is desired.

BRIEF SUMMARY OF THE INVENTION

It is therefore an object of the present invention to provide a cooking machine which will substantially ameliorate some of the disadvantages of prior art rice cake making machines.

Accordingly, in one broad form, the present invention provides a cooking machine comprising a mould with first and second similarly shaped end walls and a generally surrounding, continuous side wall, the three walls together defining an internal moulding volume, the three walls being reciprocally movable relative to one another; heating means in at least one wall or in thermal contact therewith; and control means at least controlling relative movement of the walls so that at the end of a predetermined cooking cycle the end walls and the side wall are relatively separated simultaneously.

In a one preferred embodiment, the two end walls are simultaneously retracted from the side wall so as to open the moulding volume from both ends simultaneously. In a second embodiment, one of the end wall is retracted relative to the other end wall and the side wall is also retracted relative to the other end wall, but more slowly than the first end wall so that the moulding volume is opened from both ends simultaneously.

In another aspect the invention may broadly be said to provide a method of cooking comprising: introducing a cookable mixture into a moulding volume having opposed ends; confining the volume of the moulding volume; introducing heat for a predetermined cooking cycle; allowing expansion of the moulding volume for a short predetermined period; and thence opening the moulding volume adjacent each end simultaneously and extracting the cooked article.

In the above-described machine it is preferred that the end walls include the heating elements.

In the above-described method, especially In the case of cooking rice cakes, it is preferred that immediately after the introduction of the cookable mixture, end walls of the moulding volume are pressured together so as to evenly crush the cookable mixture in a heated state so as to fuse together the individual components.

The expansion of the moulding volume after the cooking cycle is also preferably obtained by quick separation of end walls. In this separation the two end walls are completely removed from the moulding volume and then one end wall is positioned so as to allow easy removal of the cooked product.

In a further aspect, the invention provides a pneumatic device for moving an element using either a large or a small pneumatic force comprising a large cylinder defining a large air volume having a large piston therein and a small cylinder defining a small air volume having a small piston therein. The small and large pistons are coupled together and arranged for coupling to the element, each of the cylinders having an air input on one side of the respective piston and an air output on the other side of the respective piston, and the large cylinder is further provided with a selectively closable air passage extending between the two sides of the large piston, such that, when a large pneumatic force is required, the air passage is closed so that air pressure on the one side of the large piston provides the force, whereas when a small pneumatic force is required, the air passage is open so that air pressure in the large cylinder is equalized on either side of the large piston such that the air pressure on the one side of the small piston provides the force.

Preferably, the element to be moved by the device is one or more of the end and side walls of the cooking machine.

BRIEF DESCRIPTION OF THE DRAWINGS

By way of example only, two preferred forms of the invention will now be described with reference to the accompanying drawings, of which:

FIGS. 2 (A) to (F) are schematic cross-sections of the mould components of a rice cake making machine according to a second embodiment of the invention showing the various stages of movement of the mould components.

DETAILED DESCRIPTION OF THE DRAWINGS

Figure 1:
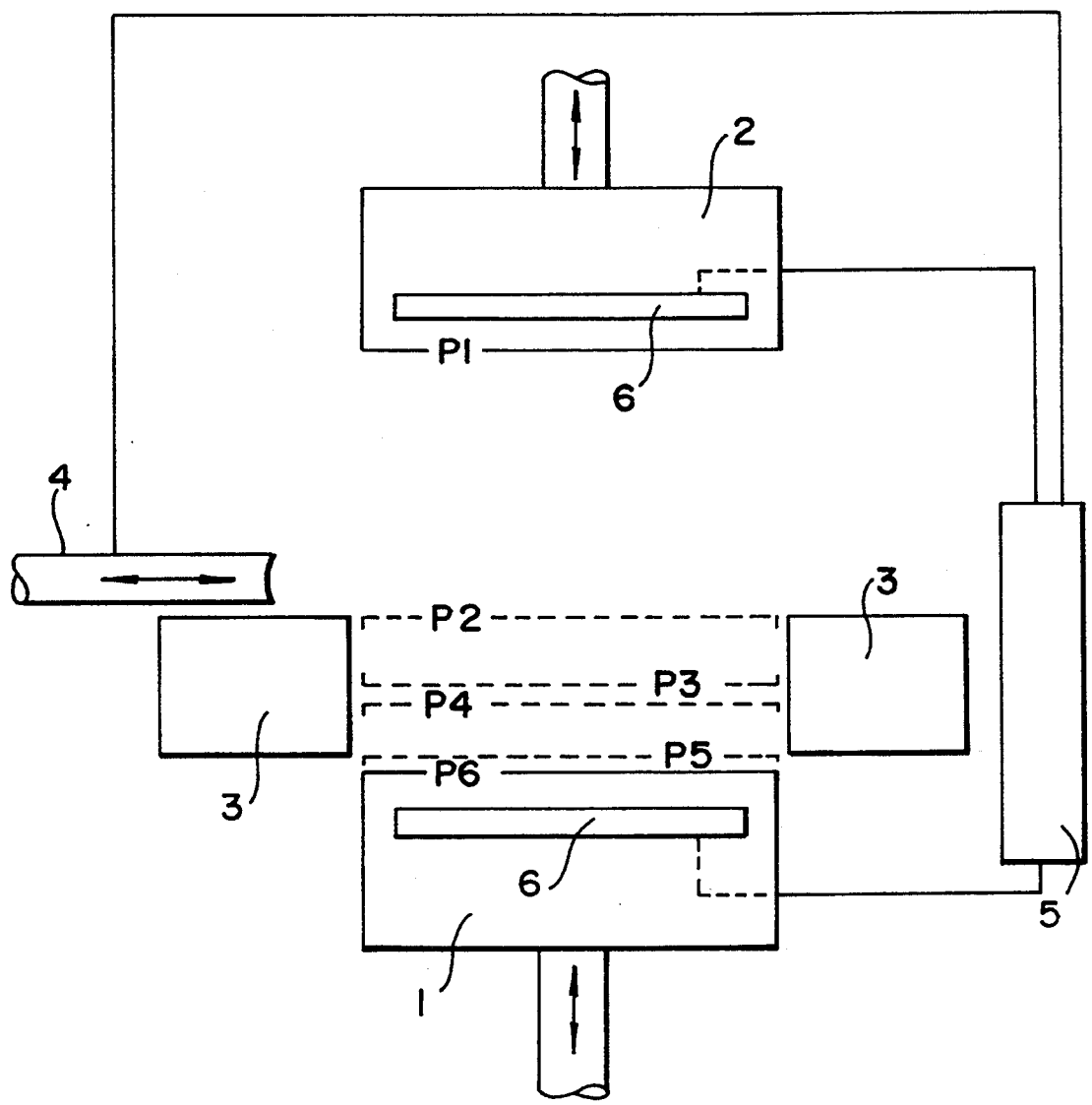
FIG. 1 is a schematic cross section of the mould components of one embodiment of a rice cake making machine according to the present invention.

As shown in FIG. 1, the basic components of one embodiment of a rice cake making machine include a bottom end wall 1, top end wall 2 and a cylindrical side wall 3. As will be seen, both end walls 1 and 2 fit neatly and closely within the cylindrical side wall 3. Thus, when the end walls 1 and 2 are in, for example respective positions P4 and P3 there is defined between the three walls a small moulding volume in which a suitable mixture may be cooked.

As will be later described, both the end walls 1 and 2 can be moved in various positions axially of the generally cylindrical side wall 3. This movement is produced by pneumatic cylinders.

Another component of the device is the food mixture supply mechanism 4. As will be later described, mechanism 4 provides a dual purpose, firstly supplying the mixture to be cooked and secondly removing cooked rice cakes from the machine. Mechanism 4 is reciprocally movable in a generally horizontal direction by pneumatic devices which are not shown in the drawing.

It will be appreciated that the end gap between the side wall 3 and the end walls 1 and 2 is exaggerated for the benefit of clarity of the drawing. In the cooking device, this gap will be in the order of some hundredths of a millimeter.

A further component of the cooking device is a microprocessor control device 5 which receives various signals from, for example, thermocouples indicating temperature within heated devices, reed switches indicating relative position of the movable components, and electronic clocks providing predetermined timing periods. The microprocessor control device 5 maintains the desired coordination of component movements and cooking cycles.

In operation, a heating element 6 within each of the end walls 1 and 2 raise the temperature of these components until some predetermined cooking temperature, e.g., 215° C.–230° C., is reached. The mixture supply mechanism 4 then moves above the moulding volume and introduces a controlled quantity of rice mixture. Upon retraction of the mechanism 4 the end wall 2 is forced down and the end wall 1 is forced up by the pneumatic cylinders so as to compress the rice mixture. During this compression step the rice mixture is fused to form more or less a unit structure. The rice mixture then cooks for a predetermined time, e.g., 6–8 seconds, within the moulding volume.

After the lapse of the predetermined cooking period, end walls 1 and 2 move apart at speeds such that end wall 2 reaches P2 at the same time that end wall 1 reaches P5. Rapid expansion of the chamber causes a rapid expansion of the rice, and the pressure release from both ends of the mould as end wall 1 and 2 clear the side walls 3 causes the expansion to halt. The shape of the rice cake is determined at that instant. End wall 2 continues to raise to position P1 as end wall 1 continues To lower to position P6 then raises to position P2 to eject the rice cake from within mould 3.

The formed and cooked rice cake is then ejected by the horizontal movement of mechanism 4 as it positions itself for introduction of new rice mixture and a repeat of the above cycle.

During the whole cycle, the earlier mentioned heating elements will be periodically energized so as to keep the temperature within a desired operating range.

As mentioned with reference to FIG. 1, movement of the upper and lower walls allows simultaneous release of pressure in the cooking chamber, from both the upper opening (between the side walls of the ring mould and upper surface formed by the upper mould) and the lower opening (between the side walls of the ring mould and lower surface formed by the lower mould).

The release of pressure from both the upper and lower openings significantly improves the quality and consistency of the rice cakes produced, resulting in a more controlled expansion of the grains, squarer edges and smoother top and bottom surfaces, and a much stronger bonding together of the rice grains.

This was not obtained in prior art devices wherein at the completion of the cooking cycle, top end wall 2 only separated from the walls of mould 3, allowing pressure release from only one end or surface of the chamber, resulting in less even expansion of the rice. The current invention is intended to result in a significant improvement in the flatness of the surfaces, and in the strength and bonding together of the rice grains.

In the prior art devices, crushing of the rice during the cooking cycle was achieved by the upper mould applying a strong force against a lower mould which was mechanically stopped by a narrow neck of the ring mould at its bottom edge.

FIGS. 2 (A) to (F) shows schematically the various stages in operation of a second embodiment of the invention. Since the cooking cycle is similar to that of the first embodiment it will not be described again. Furthermore, although the control apparatus and heating and sensing elements are incorporated in this embodiment, similarly to the first embodiment, they will not be further described here.

In this Figure, the mould components, similarly to those of FIG. 1, comprise upper 7 and lower 8 end walls and a generally cylindrical surrounding side wall 9 which define a moulding volume 10 therebetween (as best seen in FIG. 2 (E)). The cooking machine further comprises a supply plate arrangement comprising upper 11 and lower 12 supply plates which move in a reciprocable fashion into and out of the space between the moulding volume 10 and the upper end wall 7.

The configuration of this embodiment is designed to reduce the consumption of air used by the pneumatic actuators in moving the walls between their various configurations. As shown in FIG. 2, the operation of this embodiment involves movement of only one end wall (in this case the lower end wall 8) and the side wall 9 with the other end wall (in this case upper end wall 7) remaining fixed. Of course, alternatively, the lower end wall 8 could remain fixed and the upper end wall 7 be movable, if desired.

The operation of the machine starts with the lower end wall 8 and the side wall 9 at the same level and spaced from the upper end wall 7 to enable the upper and lower supply plates 11 and 12 to enter the space between the upper and lower end walls 7 and 8 as shown by arrows 16 in FIG. 2(A). The upper supply plate 11 is provided with an aperture 13 in which a controlled quantity of rice mixture is supported by the lower supply plate 12. When the supply plates 11 and 12 are in position above the lower end wall 8, the lower supply plate 12 is first retracted in direction of arrow 14 (see FIG. 2 (B)) to allow the rice mixture to fall from the aperture 13 onto the lower end wall 8, following which the upper supply plate 11 is also retracted in direction of arrow 14 (see FIG. 2 (C)).

For the crushing and cooking stages, the lower end wall 8 is moved upwards against the upper end wall 7 (which is in a fixed position), as shown by arrow 15. At the same time, side wall 9 is moved upwards in direction of arrows 17 so as to surround the crushing and cooking volume between the upper and lower end walls 7 and 8 (see FIG. 2 (D)).

At the end of the cooking cycle, the two end walls 7 and 8 separate simultaneously from the side wall 9. As shown in FIG. 2 (E), this is achieved by the lower end wall 8 moving away from upper end wall 7 in direction of arrow 18 at a high speed and the side wall 9 also moving away from the upper end wall 7 in the direction of arrows 19 but at a lower speed, such that both end walls 1 and 8 separate from side wall 9 simultaneously.

Thus, pressure is released from the moulding volume 10 at both sides of the side wall 9 at the same time.

Finally, as shown in FIG. 2 (F), the side wall 9 is moved down in direction of arrows 19, while end wall is moved down in direction of arrow 18 until they are level so that, as the supply plates 11 and 12 move as shown in FIG. 2 (A) to bring a fresh quantity of rice mixture, they automatically push the cooked rice cake off the top of the lower end wall and side wall.

The added advantage of this embodiment, compared to the embodiment shown in FIG. 1, is that considerably less air is required, as the crushing and holding of the rice mixture during cooking is done with the force of one movable end wall against a fixed end wall instead of requiring two movable end walls acting against each other. The movement of the side wall requires little force as there is only a small amount of frictional resistance involved.

The double supply plate also reduces air consumption and simplifies operation of the machine by requiring the movable end wall to have to stop in only two positions. This allows a greater advantage to be taken of the air saving capacity of a pneumatic device having a combined large and small cylinder as described further below.

Figure 3:
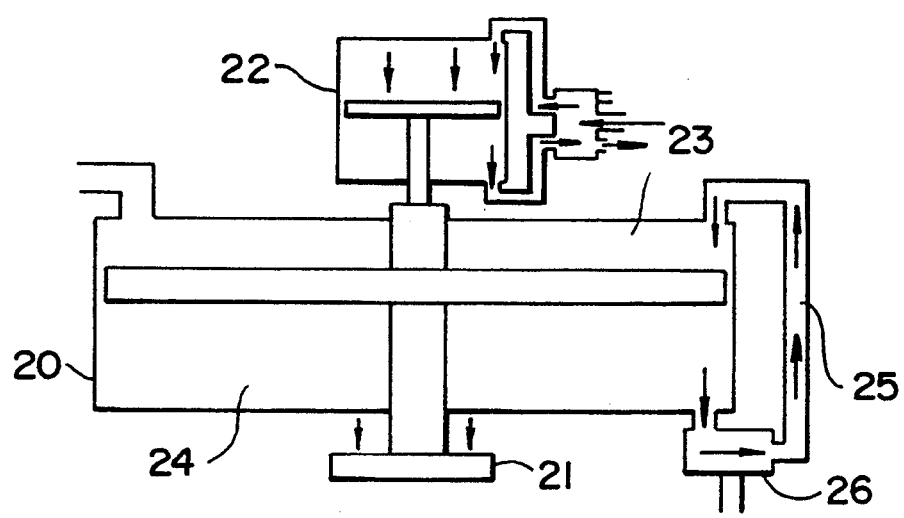
FIGS. 3 and 4 are schematic cross-sections of an upper pneumatic cylinder arrangement for moving an end wall of the rice making machine.
Figure 4:
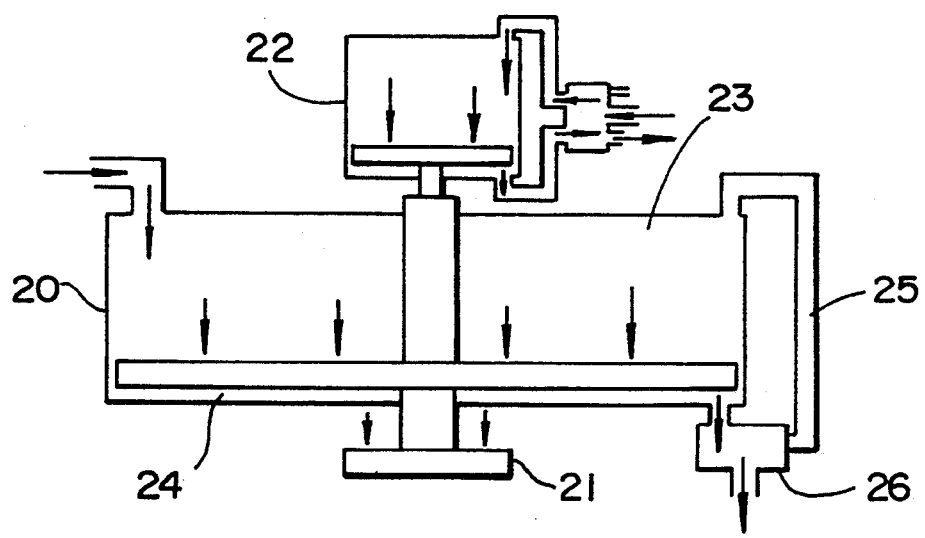

As shown in FIG. 3, crushing is achieved by using a large air cylinder 20. It may be attached to either or both the upper 21 or lower end wall (not shown). The upper end wall is attached to a slightly larger air cylinder and is positioned halfway into the ring mould at the end of the upper cylinder's downstroke. A slightly smaller cylinder pushes the lower end wall up against the stationary upper end wall and crushes the rice. At the completion of the cooking time, the upper and lower end walls move apart and move out of the ring mould simultaneously. The precise timing of the movement of the walls is controlled by speed control valves on the solenoid valve of the upper and lower cylinders.

Air consumption per cake produced has been reduced by about 75% over the previous design, by incorporating smaller 80 mm cylinders 22 attached to the shafts of the larger 228 mm cylinders 20. For most of the movements of the upper and lower walls (opening of the moulds, ejecting of the rice cake, and moving into position prior to crushing the rice), the force comes from the smaller cylinders 22 alone with the air pressure being conserved In the larger cylinders during these movements by, effectively, recycling the air from one chamber to the other of each of the large cylinders. Each large cylinder has its upper 23 and lower 24 chambers connected by an air line 25, running through a three way solenoid valve 26. During those stages of the cycle when the force of the small cylinder 22 acting on the large cylinder shaft is sufficient, both chambers of the large cylinder (which have the same area of cross-section) remain at full air pressure, connected to the air supply, with the pressurized air passing between the upper and lower chambers of the large cylinder. When the extra force of the large cylinder is required (i.e., to hold the upper mould in the down position and move the lower mould up to crush the rice against the upper mould), the three way valve shuts off the free passage of air between the upper and lower chambers, and dumps the air out of one chamber of the large cylinder as shown in FIG. 3. The other chamber 23 remains connected to the air supply and can exert its full force.

The air loss is minimized, being only that which is dumped from the cylinder at that stage of the production cycle. To continue the cycle, the exhausted chamber 24 must be recharged with air as the exhaust is closed off and the two chambers are reconnected.

While the present invention has been described with reference to particular details of construction and method steps, these should be understood as having been provided by way of example and not as limitations to the scope of the invention.

I claim:

1. A method of cooking comprising:
   introducing a cookable mixture into a moulding volume having opposed ends;
   confining the volume of the moulding volume;
   introducing heat for a predetermined cooking cycle;
   allowing expansion of the moulding volume for a short predetermined period; and
   opening the moulding volume adjacent each end simultaneously and extracting the cooked article.

2. A method of cooking according to claim 1, wherein immediately after the introduction of the cookable mixture, end walls of the moulding volume are pressured together so as to evenly crush the cookable mixture in a heated state so as to fuse together the individual components.

3. A method of cooking according to claim 2, wherein the expansion of the moulding volume after the cooking cycle is obtained by quick separation of end walls.

4. A method of cooking according to claim 3, wherein in the separation one end wall is completely removed from the moulding volume while the other end wall is positioned so as to allow easy removal of the cooked product.

5. A pneumatic device for moving an element using either a large or a small pneumatic force comprising a large cylinder defining a large air volume having a large piston therein and a small cylinder defining a small air volume having a small piston therein, the small and large pistons being coupled together and arranged for coupling to the element, each of the cylinders having an air input on one side of the respective piston and an air output on the other side of the respective piston, and the large cylinder further being provided with a selectively closable air passage extending between the two sides of the large piston, such that, when a large pneumatic force is required, the air passage is closed so that air pressure on the one side of the large piston provides the force, whereas when a small pneumatic force is required, the air passage is open so that air pressure in the large cylinder is equalized on either side of the large piston such that the air pressure on the one side of the small piston provides the force.

6. A pneumatic device according to claim 5, wherein the element comprises at least one end wall a cooking machine.

7. A pneumatic device according to claim 5, wherein the element comprises at least one of an end wall and a side wall of a cooking machine.

8. A pneumatic device according to claim 6, wherein said cooking machine comprises a mould with first and second similarly shaped end walls and a generally surrounding, continuous side wall, the three walls together defining an internal moulding volume, said three walls being reciprocally movable relative to one another.

9. A pneumatic device according to claim 7, wherein said cooking machine comprises a mould with first and second similarly shaped end walls and a generally surrounding, continuous side wall, the three walls together defining an internal moulding volume, said three walls being reciprocally movable relative to one another.

* * * * *